(12) United States Patent
Colaianna et al.

(10) Patent No.: US 11,427,662 B2
(45) Date of Patent: Aug. 30, 2022

(54) FLUOROPOLYMER COMPOSITION FOR COMPONENTS OF LIGHT EMITTING APPARATUSES

(71) Applicant: SOLVAY SPECIALTY POLYMERS ITALY S.P.A., Bollate (IT)

(72) Inventors: Pasqua Colaianna, Milan (IT); Mattia Bassi, Milan (IT); Giambattista Besana, Mariano Comense (IT); Claudia Manzoni, Bologna (IT); Luca Colombo, Parabiago (IT); Mehdi Emad, Collegeville, PA (US)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 1000 days.

(21) Appl. No.: 16/081,670

(22) PCT Filed: Feb. 28, 2017

(86) PCT No.: PCT/EP2017/054580
§ 371 (c)(1),
(2) Date: Aug. 31, 2018

(87) PCT Pub. No.: WO2017/148905
PCT Pub. Date: Sep. 8, 2017

(65) Prior Publication Data
US 2022/0017669 A1    Jan. 20, 2022

(30) Foreign Application Priority Data
Mar. 4, 2016   (EP) ...................................... 16158794

(51) Int. Cl.
*C08F 214/26*    (2006.01)
*C08K 3/01*    (2018.01)
(Continued)

(52) U.S. Cl.
CPC ...... *C08F 214/262* (2013.01); *B29C 45/0001* (2013.01); *B29C 45/53* (2013.01);
(Continued)

(58) Field of Classification Search
CPC .... C08F 214/262; C08F 2800/10; C08K 9/06; C08K 2201/006; B29C 45/0001; B29C 45/54; B29C 45/63; B29K 2027/18
(Continued)

(56) References Cited

U.S. PATENT DOCUMENTS

| 4,864,006 A | 9/1989 | Giannetti et al. |
| 2010/0032702 A1 | 2/2010 | Lahijani |

(Continued)

FOREIGN PATENT DOCUMENTS

| EP | 2987833 A1 | 2/2016 |
| JP | 2011195710 A2 | 10/2011 |

(Continued)

OTHER PUBLICATIONS

Standard ASTM D3418, "Standard Test Method for Transition Temperatures and Enthalpies of Fusion and Crystallization of Polymers by Differential Scanning Calorimetry", 2008, p. 1-7.

(Continued)

*Primary Examiner* — Michael M. Bernshteyn
(74) *Attorney, Agent, or Firm* — Osha Bergman Watanabe & Burton LLP

(57) ABSTRACT

The invention pertains to a fluoropolymer composition comprising certain tetrafluoroethylene/perfluoromethylvinylether copolymers having well-defined TFE/MVE monomer composition and possessing low molecular weight and a white pigment, to the use of this latter for manufacturing shaped articles, and to shaped articles therefrom, including components of light emitting apparatuses, e.g. LED assemblies.

20 Claims, 1 Drawing Sheet

(51) Int. Cl.
  *B29C 45/00*  (2006.01)
  *B29C 45/53*  (2006.01)
  *B29C 45/54*  (2006.01)
  *C08K 9/06*  (2006.01)
  *C08K 3/013*  (2018.01)
  *B29K 27/18*  (2006.01)

(52) U.S. Cl.
  CPC ............. *B29C 45/54* (2013.01); *C08K 3/013* (2018.01); *C08K 9/06* (2013.01); *B29K 2027/18* (2013.01); *C08F 2800/10* (2013.01); *C08K 2201/006* (2013.01)

(58) Field of Classification Search
  USPC ........................................................ 523/209
  See application file for complete search history.

(56) References Cited

U.S. PATENT DOCUMENTS

| | | |
|---|---|---|
| 2014/0063819 A1 | 3/2014 | Nam |
| 2016/0068652 A1* | 3/2016 | Akashi ................... C08L 67/03 |
| | | 524/508 |

FOREIGN PATENT DOCUMENTS

| | | | |
|---|---|---|---|
| WO | 2013025832 A1 | 2/2013 | |
| WO | WO-2013025832 A1 * | 2/2013 | .............. C08L 27/12 |

OTHER PUBLICATIONS

Murphy J., in "Additives for Plastics Handbook", 2nd Edition, 2001, Chapter 5.2.3., p. 43-48—Elsevier Advanced Technology.

* cited by examiner

FLUOROPOLYMER COMPOSITION FOR COMPONENTS OF LIGHT EMITTING APPARATUSES

CROSS-REFERENCE TO RELATED APPLICATION

This application is a U.S. national stage entry under 35 U.S.C. 071 of International Application No. PCT/EP2017/054580 filed Feb. 28, 2017, which claims priority to European application No. EP 16158794.4 filed Mar. 4, 2016. The entire contents of these applications are explicitly incorporated herein by this reference.

TECHNICAL FIELD

The invention pertains to a fluoropolymer composition comprising certain tetrafluoroethylene/perfluoromethyvinylether copolymers and a white pigment, to the use of this latter for manufacturing shaped articles, and to shaped articles therefrom, including components of light emitting apparatuses, e.g. LED assemblies.

BACKGROUND ART

Light emitting diode (LED) components, such as housings, reflectors, reflector cups, heat-sink slugs, require an especially demanding combination of excellent colour and improved physical properties, so as to ensure good opacity and outstanding reflective properties both after high temperature processing and soldering conditions (during LED assembly manufacture) and after prolonged exposure to heat and radiation, such as those of continuous LED operations. This is particularly true for LED assemblies of new generations, adapted to higher conductive power dissipations, necessitating, notably, the use of a central heat-conducting slug in packages. While ceramics might be used for manufacturing above mentioned components, their inherent cost and highly demanding processing technologies have called for alternative materials. Therefore, plastics have been extensively studied and developed to this aim.

Light-emitting diode (LED) housings are conventionally constructed from engineering plastics such as semi-aromatic polyphthalamides (PPA) to which titanium dioxide is added to increase the visible light reflectance of the housing and fillers are incorporated for improving mechanical performances and thermal resistance. However, PPA are known to be possibly susceptible to discoloring (yellowing) phenomena with use over time, resulting in overall LED efficiency drop and change in emitted color.

Fluoromaterial-based compounds have hence been proposed in this field of use, leveraging on improved thermal stability/chemical inertness of fluoromaterials over notably polyamide structures.

Hence, US 2010032702 (DUPONT) 11 Feb. 2010 discloses a light-emitting diode housing comprising a fluoropolymer and a white pigment. Fluoropolymer of utility in the LED housing provided in this document are melt extrudable and injection moldable, and have a melt flow rate of about 1.5 to about 40 g/10 min and include, inter alia, perfluoroalkoxy fluorocarbon resin (PFA), the copolymer of tetrafluoroethylene and perfluoro(alkyl vinyl ether), sold under the trademark TEFLON® PFA by DuPont, TFE/PAVE fluoropolymers, commonly known as PFA, having at least about 2 weight percent PAVE of the total weight percent, including when the PAVE is PPVE or PEVE, and typically contain about 2 to about 15 weight percent PAVE, and TFE/PAVE fluoropolymers, commonly known as MFA, when the PAVE includes PMVE, and the composition is about 0.5 to about 13 weight percent perfluoro(methyl vinyl ether), and about 0.5 to about 3 weight percent PPVE, the remainder of the total of 100 weight percent being TFE.

Similarly, WO 2013/025832 (DUPONT) 21 Feb. 2013 provides a reflector for a light-emitting diode and a housing containing the reflector, created by molding fluororesin containing a filler having an average particle size less than 1.0 micrometres and a band gap greater than 3.0 eV.

JP 2011195710 (SUMITOMO ELECTRIC INDUSTRIES) 6 Oct. 2011 discloses a white resin molded product which has, as a material constituting the reflector part of LED, suitable properties such as high resistance to deterioration by heat and resistance to deterioration by light having difficulty in discoloration even when exposed to a high-temperature environment of not lower than 150° C. and light for a long time, furthermore ease of fabrication, and an LED reflector composed of this white resin molded product. The white resin molded product is obtained by molding a resin composition composed of a fluororesin (A) having a melting point of not lower than 260° C. and titanium oxide (B), and the LED reflector is composed of this white resin molded product. Working embodiment's comprise an exemplary molding composition made from HYFLON® MFA 1041 tetrafluoroethylene/perfluoromethylvinylether copolymer, which is known to possess a melt flow rate of about 25-26 g/10 min (372° C./5 kg).

Still, US 2014063819 (MITSUI DU PONT FLUORCHEMICAL) 6 Mar. 2014 discloses a reflector for a light-emitting diode which has a small decrease in reflectance in a range from the ultraviolet region to visible region, and has excellent heat resistance, light resistance, and weather resistance, and a housing having this reflector. This reflector is obtained by molding a fluororesin composition containing a filler with an average particle diameter of smaller than 1 μm, wherein the difference between the maximum value and the minimum value of the reflectance at a wavelength of 240-700 nm is within 25%. The fluororesin is preferably selected among TFE copolymers such as FEP (TFE/HFP copolymer), PFA (TFE/PAVE copolymer), TFE/HFP/PAVE copolymer, where PAVE is perfluoro(ethylvinyl ether) (PEVE) and/or perfluoro(propylvinyl ether) (PPVE), MFA (TFE/perfluoro(methyvinyl ether) (PMVE)/PAVE copolymer, where the alkyl group of PAVE has 2 or more carbon atoms), THV (TFE/HFP/vinylidene fluoride (VF2) copolymer), etc. The TFE copolymer has a melt flow rate (MFR) of about 0.5-100 g/10 min, preferably 0.5-50 g/10 min, which is measured at a standard temperature of said specific TFE copolymer according to ASTM D-1238.

Nevertheless, there is a continuous need for polymer compositions suitable to be used for manufacturing injection molded parts, in particular LED components, possessing improved performances, including, notably, higher reflectance of light (in general, of visible light), higher whiteness, both initial and after thermal aging, while maintaining outstanding processability (e.g. good moldability in replicating miniaturized patterns), high dimensional stability (notably low coefficient of linear expansion), high mechanical strength, high heat deflection temperature and high heat & light resistance for both short and long exposure durations (low discoloration, low loss of reflectance and dimensional integrity when exposed to a high temperature e.g. by means of soldering and the like).

EP 2987833 A (DAICEL EVONIK LTD) 24 Feb. 2016 pertains to an additive that increases or improves a light resistance (or whiteness) of a non-fluorinated thermoplastic resin (e.g., a super engineering plastic, such as an aromatic polyamide, a liquid crystal polyester, or an aromatic polyetherketone resin). The additive comprises a fluorine-containing resin and an inorganic white pigment (e.g., titanium oxide). The fluorine-containing resin may be, for example, a fluorine-containing resin comprising a tetrafluoroethylene unit as a monomer unit, in particular, may be a tetrafluoroethylene copolymer (e.g., at least one member selected from the group consisting of a copolymer of tetrafluoroethylene and another fluorinated olefin, a copolymer of tetrafluoroethylene and a fluorinated vinyl ether, and a copolymer of tetrafluoroethylene, another fluorinated olefin and a fluorinated vinyl ether).

SUMMARY OF INVENTION

The Applicant has now found that certain tetrafluoroethylene/perfluoromethylvinyl ether copolymers having high melt flow rate and low comonomer content are particularly advantageous when compounded with specific ingredients (white pigments) to provide polymer compounds particularly effective in fulfilling above mentioned requirements, and hence delivering LED parts fulfilling all aforementioned requirements.

The invention further pertains to a fluoropolymer composition [composition (C)] comprising:

(i) a major amount of at least one fluoropolymer selected from the group consisting of tetrafluoroethylene (TFE)/perfluoromethylvinylether (MVE) copolymers essentially consisting of:
   from 3 to 6% moles of recurring units derived from perfluoromethylvinylether (MVE);
   from 94 to 97% moles of recurring units derived from tetrafluoroethylene (TFE),
said TFE/MVE copolymers possessing a melt flow rate (MFR) of more than 100 g/10 min, when determined at 372° C. under a piston load of 5 kg;

(ii) from 1 to 45% wt., with respect to the total weight of the composition (C) of at least one pigment selected from the group consisting of titanium dioxide ($TiO_2$), zinc disulfide ($ZnS_2$), zinc oxide (ZnO) and barium sulfate ($BaSO_4$) [pigment (P)]; and, optionally, (iii) at least one reinforcing filler [filler (F)], different from pigment (P).

The Applicant has surprisingly found that the composition (C), thanks to the presence of the particular TFE/MVE copolymer, having optimized content of MVE and low molecular weight (i.e. high MFR), when combined with above detailed ingredients, can be injection molded for providing parts possessing outstanding light reflectance capabilities (at least 80%, preferably at least 90%), both initial and, more importantly, after thermal aging, while exhibiting outstanding processability and flowability (e.g. good moldability in replicating miniaturized patterns by injection molding techniques), including the possibility of being processed in relatively smooth conditions (moderated temperatures and pressured), as well as all other desirable properties typical of fluoropolymer compositions, so as to establish as material of choice for the manufacture of components for LED, in particular reflectors.

DESCRIPTION OF EMBODIMENTS

Figure 1:
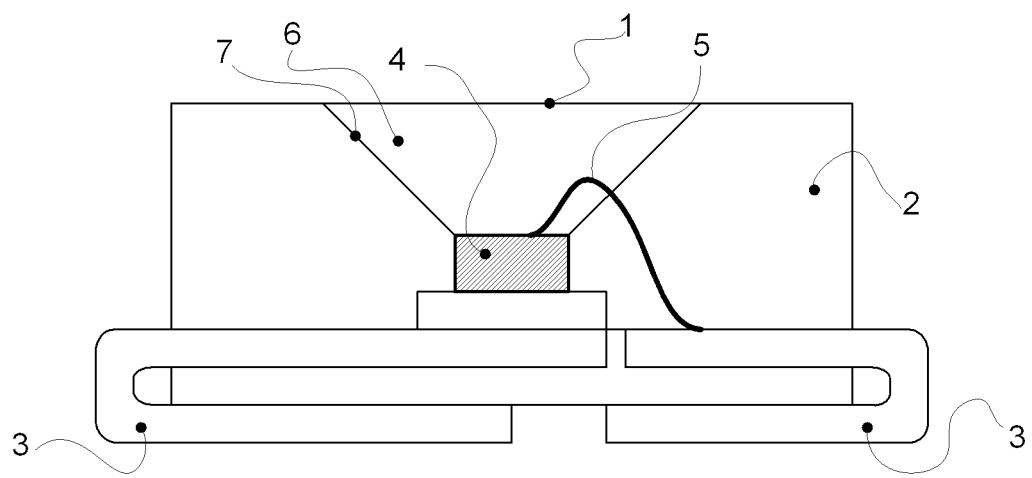
FIG. 1 is a top view LED comprising one or more component made from the composition of the invention.

The composition (C) may comprise one or more than one TFE/MVE copolymers, as above detailed.

As said above, the TFE/MVE copolymer used in the composition of the present invention essentially consists of recurring units derived from TFE and MVE, in recited amounts. End chains, impurities, defects and minor amount of other comonomers (these latter in amounts generally not exceeding 0.5%, preferably not exceeding 0.1%, with respect to the total amount of moles of recurring units derived from TFE and MVE) may be present, without these substantially affecting the properties of the said TFE/MVE copolymer.

The TFE/MVE copolymer preferably essentially consists of:
   from 3.7 to 5.8% moles of recurring units derived from perfluoromethylvinylether (MVE);
   from 94.2 to 96.3% moles of recurring units derived from tetrafluoroethylene (TFE).

The TFE/MVE copolymer generally possesses a melting point, determined according to ASTM D3418 of at least 265° C., preferably at least 270° C., and generally at most 290° C., preferably at most 285° C.

As said, the TFE/MVE copolymer possesses a MFR of more than 100 g/10 min, when determined at 372° C. under a piston load of 5 kg. Upper boundaries for the MFR are not particularly critical. Nevertheless, it is generally preferred to use in the composition (C) a TFE/MVE copolymer having a MFR of less than 400 g/10 min, advantageously of less than 300 g/10 min, preferably less than 200 g/10 min, more preferably less than 150 g/10 min, measured as above detailed, to the sake of optimizing mechanical properties.

The Applicant has surprisingly found that when the TFE/MVE copolymer simultaneously possesses the aforementioned monomer composition and melt flow rate, compositions can be processed easily to yield injection molded parts which possess very high photonic reflectance (up to beyond 90% at a wavelength of 460 nm), high heat and warpage resistance.

As said, the TFE/MVE copolymer is the major constituent of the composition (C). The weight percent of the TFE/MVE copolymer in the composition (C) is generally of at least 50 wt. %, preferably of at least 55 wt. %, and more preferably of at least 60 wt. %, based on the total weight of the composition (C). It is further understood that the weight percent of the TFE/MVE copolymer in the composition (C) will generally be of at most 95 wt. %, preferably of at most 90 wt. % and most preferably of at most 80 wt. %, based on the total weight of the composition (C).

Excellent results were obtained when the composition (C) comprised the TFE/MVE copolymer in an amount of 80-95 wt. %, preferably of 85-94 wt. %, based on the total weight of the composition (C).

Reinforcing fillers [fillers (F)] which are suitable to be possibly used in the composition (C) of the invention are well known by the skilled in the art.

Having regards to its morphology, the filler (F) of the composition (C) can be generally selected from the group consisting of fibrous fillers and particulate fillers.

Typically, the filler (F) is selected from the group consisting of mineral fillers (such as talc, mica, kaolin, calcium carbonate, calcium silicate, magnesium carbonate), glass fiber, carbon fibers, synthetic polymeric fiber, aramid fiber, aluminum fiber, titanium fiber, magnesium fiber, boron carbide fibers, rock wool fiber, steel fiber, wollastonite, inorganic whiskers. Still more preferably, it is selected from mica, kaolin, calcium silicate, magnesium carbonate, inorganic whiskers, glass fiber and wollastonite.

A particular class of fibrous fillers which are advantageously usable in the composition (C) consists of whiskers, i.e. single crystal fibers made from various raw materials, such as $Al_2O_3$, SiC, BC, Fe and Ni.

According to certain embodiments, the filler (F) can be selected from the group consisting of fibrous fillers. Among fibrous fillers, glass fibers are preferred; non (imitative examples of glass fibers include notably chopped strand A-, E-, C-, D-, S- and R-glass fibers, as described in chapter 5.2.3, p. 43-48 of Additives for Plastics Handbook, 2nd edition, John Murphy, the whole content of which is herein incorporated by reference. Glass fibers fillers useful in composition (C) may have a round cross-section or a non-circular cross-section.

In certain embodiment's of the present invention, the filler (F) is selected from the group consisting of wollastonite fillers and glass fiber fillers.

When present, the weight percent of the filler (F) in the composition (C) is generally of at least 0.1 wt. %, preferably of at least 0.5 wt. %, more preferably of at least 1 wt. % and most preferably of at least 2 wt. %, based on the total weight of composition (C). The weight percent of the filler (F) is generally of at most 30 wt. %, preferably of at most 20 wt. % and most preferably of at most 15 wt. %, based on the total weight of the composition (C).

Nevertheless, preferred compositions (C) are those wherein no additional filler (F) is added to the combination of TFE/MVE copolymer and pigment (P).

Above mentioned pigments (P) are typically known as white pigments, in that they absorb limited incident visible radiation and scatter most of said incident visible radiation. Otherwise stated, the pigments (P) used in the composition (C) generally absorb essentially no light in the visible region (wavelength 400-800 nm), but disperse incident radiation in this region as completely as possible.

The pigment (P) is selected from the group consisting of titanium dioxide ($TiO_2$), zinc disulfide ($ZnS_2$), zinc oxide (ZnO) and barium sulfate ($BaSO_4$).

The pigment (P) is advantageously present in the composition (C) under the form of particles having an average particle size (APS) of generally less than 250 μm, preferably less than 100 μm, more preferably of less than 5 μm. Larger sizes may deleteriously affect the properties of the composition.

While pigments (P) having larger APS can be used, these pigments (P) are less advantageous, in that they might impair other relevant properties (e.g. mechanical properties) of the composition (C).

Preferably, the APS of the pigment (P) is of below 1 μm. While lower boundaries for APS of pigment (P) are not particularly critical, it is generally understood that pigment (P) will have an APS of at least 0.1 μm.

The shape of the particles of pigment (P) is not particularly limited; the said particles may be notably round, flaky, flat and so on.

The pigment (P) is preferably titanium dioxide. Suitable titanium dioxide pigments can be supplied from a variety of commercial sources, including notably Chemours, ISK, and the like.

The nature of the titanium dioxide pigment is not particularly limited, and a variety of crystalline forms such as the anatase form, the rutile form and the monoclinic type can be advantageously used. However, the rutile form is generally preferred due its higher refraction index and its superior light stability. Titanium dioxide pigment may be treated on its surface with at least one treatment agent, even if embodiments wherein titanium dioxide pigments have no surface treatment are also suitable. Preferably the APS of the titanium dioxide pigment is in the range of 0.05 μm to 0.40 μm.

The weight percent of the pigment (P) in the composition (C) is generally of at least 1 wt. %, preferably of at least 3 wt. %, more preferably of at least 5 wt. % and most preferably of at least 6 wt. %, based on the total weight of the composition (C). Besides, the weight percent of the pigment (P) is generally of at most 45 wt. %, preferably of at most 30 wt. %, more preferably of at most 25 wt. % and most preferably of at most 20 wt. %, based on the total weight of the composition (C).

Excellent results were obtained when the pigment (P) was used in an amount of 3-30 wt. %, preferably of 5-25 wt. %, based on the total weight of the composition (C).

Optional Ingredients

The composition (C) can optionally comprise additional components such as stabilizing additive, notably mould release agents, plasticizers, lubricants, thermal stabilizers, light stabilizers and antioxidants etc.

The Article

An aspect of the present invention also provides an article comprising at least one component comprising the fluoropolymer composition (C), as above detailed, which provides various advantages over prior art parts and articles, in particular an increased resistance to concurrent exposure to heat and radiation (both visible and UV) while maintaining all their other properties at a high level. Preferably, the article or part of the article consists of the composition (C) as above detailed.

In a particular embodiment, the article is a light emission apparatus.

Non limitative examples of light emission apparatuses are keyless entry systems of an automobile, lightings in a refrigerator, liquid crystal display apparatuses, automobile front panel lighting apparatuses, desk lamps, headlights, household electrical appliance indicators and outdoor display apparatuses such as traffic signs, and optoelectronic devices comprising at least one semi-conductor chip that emits and/or transmits electromagnetic radiation commonly known as Light Emitting Diodes devices (LEDs). Preferably, the light emission apparatus is a Light Emitting Diode device (LED).

LEDs are preferably chosen from the group of top view LEDs, side view LEDs and power LEDs. Top view and side view LEDs comprise usually a basic housing, which, in general, acts as reflector; besides, top view and side view LEDs usually do not comprise any heatsink slug. On the other hand, power LEDs comprise usually a heatsink slug, which, in general, acts as reflector; power LEDs usually further comprise a basic housing, which is a part distinct from the heatsink slug.

The top view LEDs are notably used in automotive lighting applications such as instrumental panel displays, stop lights and turn signals. The side view LEDs are notably used for mobile appliance applications such as, for example, cell phones and PDAs. The power LEDs are notably used in flashlights, automotive day light running lights, signs and as backlight for LCD displays and TVs.

The LED according to the present invention comprises at least one part comprising the composition (C) as above described. The part is preferably selected from the group consisting of basic housings and heatsink slugs. The part made from the composition (C), as above detailed, is generally intended to act as reflector.

Preferably at least 50 wt. % and more preferably more than 80 wt. % of the part comprises the composition (C), being understood that the part may possibly further contain other materials, e.g. a metal; for example, for certain end uses, the surface of certain parts made from the composition (C), as above detailed, and acting as reflector, may be metal plated. More preferably, more than 90 wt. % of the part comprises the composition (C). Still more preferably, the part consists essentially of the composition (C). The most preferably, the part consists of the composition (C).

An exemplary embodiment of a top view LED is provided in FIG. 1, which illustrates a sectional view of said embodiment. The top view LED 1 comprises a basic housing 2 comprising, and preferably consisting of, the composition (C) as above detailed. As will be detailed hereafter, the basic housing 2 acts also as reflector cup. No heatsink slug is present. Usually, the LED 1 further comprises a prefabricated electrical lead frame 3. Lead frame 3 can be advantageously encapsulated by injection moulding with the composition (C) included in the basic housing 2.

The basic housing 2 has a cavity 6. A semiconductor chip 4 that emits electromagnetic radiations, such as a LED chip, is mounted inside such cavity. The semiconductor chip 4 is generally bonded and electrically contact-connected on one of the lead frame terminals by means of a bonding wire 5.

A transparent or translucent potting compound (e.g. an epoxy, a polycarbonate or a silicone resin, not shown in FIG. 1) is generally built into the cavity in order to protect the LED chip. It is customary, for the purpose of increasing the external efficiency of the LED chip, to shape the cavity of the basic housing with non perpendicular inner areas in such a way that the cavity acquires a form opening towards the front side (the sectional view of the inner wall of the cavity may have, for instance, the form of an oblique straight line, as in the exemplary embodiment in accordance with FIG. 1, or that of a parabola).

Thus, the inner walls 7 of the cavity serve as reflector cup for the radiation which is emitted laterally by the semiconductor chip, notably reflecting this radiation towards the front side of the basic housing.

It is understood that the number of chips which can be mounted in the cavity of the basic housing, as well as the number of cavities which can be formed inside a basic housing, is not restricted to one.

Figure 2:
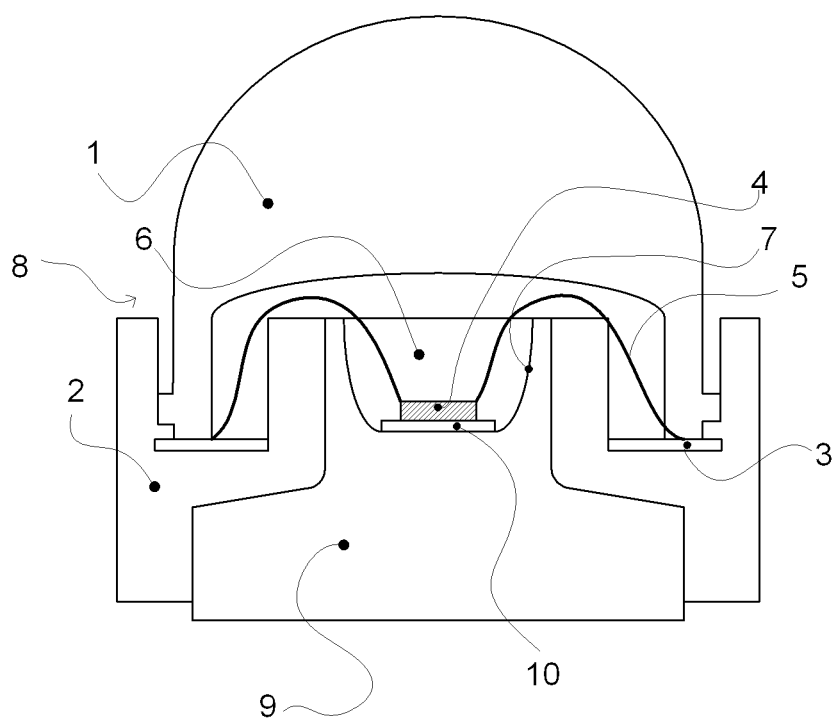
FIG. 2 is a power LED comprising one or more component made from the composition of the invention.

An exemplary embodiment of a power LED is provided in FIG. 2, which illustrates a sectional view of said embodiment. The power LED 8 comprises advantageously an aspherical lens 1 and a basic housing 2 comprising, and preferably consisting of, the composition (C), as above detailed. As in the previous embodiment, the LED 8 further comprises a prefabricated electrical lead frame 3.

The power LED 8 also comprises a carrier body or heatsink slug 9 which may comprise, or consist of, the composition (C) as above detailed. A cavity 6 is realized in the upper portion of the heatsink slug 9. A semiconductor LED chip 4 that emits electromagnetic radiations is mounted on the bottom area of cavity 6 and it is generally fixed by means of a chip carrier substrate or solder connection 10 to the heatsink slug 9. The solder connection 10 is generally an epoxy resin or another equivalent adhesive material. The LED chip is generally conductively connected to the electric terminals of the lead frame 3 via the bonding wires 5.

The inner walls 7 of the cavity 6 run generally from the bottom area of the cavity to the front side so as to form a reflector cup increasing the external efficiency of the LED chip. The inner walls 7 of the reflector cup may be, for example, straight and oblique or concavely curved (like in the exemplary embodiment in accordance with FIG. 2).

The lead frame 3 and the heatsink slug 9 are generally encapsulated within the basic housing 2. In order to protect the LED chip 4, the cavity is generally completely filled, likewise in the first exemplary embodiment of FIG. 1, with a radiation-transmissive, for example transparent, encapsulation compound (the encapsulant is not shown in FIG. 2). The composition (C) as above detailed is particularly suitable for making basic housings and/or heatsink slugs as above described, because, besides having excellent thermal conductivity thus allowing the heat produced by the optoelectronic device to be easily dissipated, it has also good mechanical properties, high heat deflection temperature, good plateability, good adhesion to lead frame, excellent optical properties, notably excellent initial whiteness and high retention of reflectance, even after prolonged exposure to heat and radiation.

Method of Making the Article

The article as above detailed can be manufactured processing the composition (C) as above detailed through standard techniques, including notably compression molding, extrusion molding, injection molding, or other melt-processing techniques.

It is nevertheless generally understood that the method of making the article, as above detailed, generally comprises a step of injection molding the composition (C), as detailed above.

The step of injection moulding generally uses a ram or screw-type plunger to force molten composition (C) into a mould cavity; within the cavity of the said mould, the composition (C) solidifies into a shape that has conformed to the contour of the mould.

Moulds which can be used can be single cavity moulds or multiple cavities moulds.

Should the disclosure of any patents, patent applications, and publications which are incorporated herein by reference conflict with the description of the present application to the extent that it may render a term unclear, the present description shall take precedence.

The invention will now be described in more details with reference to the following examples whose purpose is merely illustrative and not intended to limit the scope of the present invention.

EXAMPLES

Preparative Example 1—Preparation of a TFE/MVE Copolymer 96/4 Mol/Mol Having a MFR of 110 g/10 Min 13.9 lt of demineralized water, 128 gr of a microemulsion prepared according to U.S. Pat. No. 4,864,006 were introduced in sequence in a 22 lt AISI 316 steel vertical, equipped with stirrer working at 400 rpm, after vacuum has been made. Then, reactor was heated until reaching the temperature of 75° C. and at this temperature ethane was introduced in an amount equal to 0.8 absolute bar and MVE in an amount of 3.1 absolute bar are fed. A gaseous TFE/FMVE mixture in nominal molar ratio TFE/MVE of 24 mol/mol was fed, until reaching a pressure of 21 absolute bar through a suitable compressor. Through a metering pump, 118 ml of an Ammonium Persulfate solution in water (0.044 M) were fed to initiate polymerization. The polymerization pressure was maintained constant by feeding the aforesaid monomeric mixture; when 8800 g of the above mixture were fed, monomers feeding was interrupted, stirring stopped and the pressure was let decrease until it reached 7.5 absolute bar. The reactor was cooled at room temperature, the emulsion was discharged and coagulated with nitric acid 65%. The coagulated polymer, under the form of powder, was washed with water and then dried at 220° C. The polymeric composition was found to be MVE 4% mol and TFE 96% mol, MFI (372° C./5 kg) was 110 g/10 min and melting point was 284° C.

Preparative Example 2—Preparation of a TFE/MVE Copolymer 96/4 Mol/Mol Having a MFR of 170 g/10 Min The polymerization described in example 1 was repeated except for the amount of the following components: Ethane 0.87 absolute bar. The polymer was found to possess a MFI 170 g/10.

General Compounding Procedure

The following white pigments were used:

Pig-1: commercially available rutile $TiO_2$ manufactured by chloride process, treated with silica and alumina and siloxane, having particle size 0.21 (μm) and oil absorption 15 g/100 g.

Pig-2: commercially available rutile $TiO_2$ manufactured by chloride process, treated with silica and alumina and siloxane, having particle size 0.21 (μm) and oil absorption 16 g/100 g.

The powder obtained from Ex. 1 or 2 (or of comparative product) was mixed in a turbomixer for 2 minutes with $TiO_2$ in weight ratios, as specified in the Table 1, and resulting mixture was pelletized in a Brabender conical twin screw extruder. The temperature profile was set in order to have a melt temperature in a range between 280° C. and 320° C. depending on the melt viscosity and the melting point of the polymer.

Then the pellets underwent melt-compression moulding at 350° C. in a vertical press in order to make a plaque with a thickness of about 1.5 mm. The reflectance of the sample was measured at room temperature and results were summarized in Table 2.

Manufacture of Injection Molded Articles

Pellets of the composition, prepared as above detailed, were processed by injection molding for manufacturing final parts having comb-like shape, using a complex mold suitable for assessing processability into thin walled and complex shapes. The press used was a Negri Bossi NB100 having a clamping force of 100 tons equipped with a barrel of 30 mm as diameter and 720 mm long. The injection molding conditions were set in order to have a good filling of the cavity, pressures and temperatures change according to the viscosity and the melting point of the polymers. The temperature profile was set in order to have a nozzle temperature around 330° C., while the mold temperature was set at 130-140° C. Reflectivity was measured and data are summarized in Table 2.

Method for Determining Reflectance

The reflectance is defined as the ratio of reflected radiant flux to incident radiant flux and was measured by illuminating the sample (either a compression molded specimen or an injection molded specimen) with a 45° circumferential D65 source, collecting the light at 0° thus excluding the specular component.

The spectral reflectance (a relative reflectance using a standard white plate as a control) had been measured at each wavelength between 400 and 700 nm by a spectrophotometer (Colorview produced by BYK-Gardner). The Yellow Index (YI) was calculated according the ASTM E313-00 standard, using a D65/10° geometry.

TABLE 1

| Run | fluoropolymer (type) | MFI (g/10') | $T_m$ (° C.) | $TiO_2$ (type) | $TiO_2$ (% wt) |
|---|---|---|---|---|---|
| A | From Ex. 1 | 110 | 284 | Pig-1 | 7 |
| B | From Ex. 2 | 170 | 284 | Pig-1 | 7 |
| C | From Ex. 2 | 170 | 284 | Pig-2 | 7 |
| Comp (a) | 1041(*) | 26 | 287 | Pig-1 | 7 |
| Comp (b) | 1041(*) | 26 | 287 | Pig-2 | 7 |

(*)1041: commercially available HYFLON ® MFA 1041 material

TABLE 2

| | Reflectance on Moulded plaques | | Reflectance on injection molded parts | |
|---|---|---|---|---|
| Run | R (460 nm) | YI | R (460 nm) | YI |
| A | 91 | 6 | | |
| B | 91 | 6 | | |
| C | 93 | 6 | 92 | 4 |
| Comp (a) | 92 | 6 | 86 | 6 |
| Comp (b) | 95 | 4 | | |

As evidenced by the data collected in Table 2, only when combining the pigment with the TFE/MVE copolymer possessing specific monomer composition and melt flow rate, it has been possible to obtain injection molded parts possessing outstanding reflectance and whiteness.

Comparative compositions, while possibly delivering appropriate reflectance under the form of compression molded plaque, cannot deliver outstanding reflectance and whiteness, when processed by injection molding.

The invention claimed is:

1. A fluoropolymer composition (C) comprising:
   (i) a major amount of at least one fluoropolymer selected from the group consisting of tetrafluoroethylene (TFE)/perfluoromethylvinylether (MVE) copolymers consisting essentially of:
      from 3 to 6% moles of recurring units derived from perfluoromethylvinylether (MVE);
      from 94 to 97% moles of recurring units derived from tetrafluoroethylene (TFE),
      said TFE/MVE copolymers possessing a melt flow rate (MFR) of more than 100 g/10 min, when determined at 372° C. under a piston load of 5 kg;
   (ii) from 1 to 45% wt., with respect to the total weight of composition (C) of at least one pigment (P), wherein pigment (P) is selected from the group consisting of titanium dioxide ($TiO_2$), zinc disulfide ($ZnS_2$), zinc oxide (ZnO) and barium sulfate ($BaSO_4$); and, optionally,
   (iii) at least one reinforcing filler (F), different from pigment (P).

2. The composition (C) of claim 1, wherein the TFE/MVE copolymer consists essentially of:
   from 3.7 to 5.8% moles of recurring units derived from perfluoromethylvinylether (MVE);
   from 94.2 to 96.3% moles of recurring units derived from tetrafluoroethylene (TFE).

3. The composition (C) of claim 1, wherein the TFE/MVE copolymer possesses a melting point, determined according to ASTM D3418, of at least 265° C., and at most 290° C.

4. The composition (C) of claim 1, wherein the TFE/MVE copolymer the TFE/MVE copolymer has a MFR of less than 400 g/10 min.

5. The composition (C) according to claim 1, wherein the TFE/MVE copolymer is the major constituent of the composition (C) or wherein the weight percent of the TFE/MVE copolymer is of at least 50 wt. %, based on the total weight of composition (C).

6. The composition (C) according to claim 1, wherein pigment (P) is present in composition (C) under the form of particles having an average particle size (APS) of less than 250 μm.

7. The composition (C) according to claim 1, wherein pigment (P) is titanium dioxide.

8. The composition (C) according to claim 1, wherein the weight percent of pigment (P) in composition (C) is at least 3 wt. %, based on the total weight of the composition (C) and/or wherein the weight percent of pigment (P) is at most 30 wt. %, based on the total weight of composition (C).

9. An article comprising at least one component comprising the fluoropolymer composition (C) according to claim 1.

10. The article of claim 9, said article being a light emission apparatus selected from the group consisting of keyless entry systems of an automobile, lightings in a refrigerator, liquid crystal display apparatuses, automobile front panel lighting apparatuses, desk lamps, headlights, household electrical appliance indicators and outdoor display apparatuses, and optoelectronic devices comprising at least one semi-conductor chip that emits and/or transmits electromagnetic radiation commonly known as Light Emitting Diodes devices (LEDs).

11. A method for making the article of claim 9, the method comprising processing a fluoropolymer composition (C) through standard techniques, including compression molding, extrusion molding, injection molding, or other melt-processing techniques wherein fluoropolymer composition (C) comprises:
   (i) a major amount of at least one fluoropolymer selected from the group consisting of tetrafluoroethylene (TFE)/perfluoromethylvinylether (MVE) copolymers consisting essentially of:
      from 3 to 6% moles of recurring units derived from perfluoromethylvinylether (MVE);
      from 94 to 97% moles of recurring units derived from tetrafluoroethylene (TFE),
   said TFE/MVE copolymers possessing a melt flow rate (MFR) of more than 100 g/10 min, when determined at 372° C. under a piston load of 5 kg;
   (ii) from 1 to 45% wt., with respect to the total weight of composition (C) of at least one pigment (P), wherein pigment (P) is selected from the group consisting of titanium dioxide ($TiO_2$), zinc disulfide ($ZnS_2$), zinc oxide (ZnO) and barium sulfate ($BaSO_4$); and, optionally,
   (iii) at least one reinforcing filler (F), different from pigment (P).

12. The method of claim 11, said method comprising injection molding the composition (C).

13. The method of claim 12, wherein the step of injection moulding uses a ram or screw-type plunger to force molten composition (C) into a mould cavity; and wherein within the cavity of said mould, the composition (C) solidifies into a shape that has conformed to the contour of the mould.

14. The composition (C) of claim 3, wherein the TFE/MVE copolymer possesses a melting point, determined according to ASTM D3418, of at least 270° C., and at most 285° C.

15. The composition (C) of claim 4, wherein the TFE/MVE copolymer the TFE/MVE copolymer has a MFR of less than 300 g/10 min.

16. The composition (C) of claim 4, wherein the TFE/MVE copolymer the TFE/MVE copolymer has a MFR of less than 150 g/10 min.

17. The composition (C) according to claim 5, wherein the weight percent of the TFE/MVE copolymer is of at least 55 wt. %, based on the total weight of composition (C).

18. The composition (C) according to claim 5, wherein the weight percent of the TFE/MVE copolymer is of at least 60 wt. %, based on the total weight of composition (C).

19. The composition (C) according to claim 6, wherein pigment (P) is present in the composition (C) under the form of particles having an average particle size (APS) of less than 100 μm.

20. The composition (C) according to claim 8, wherein the weight percent of pigment (P) in composition (C) is at least 6 wt. %, based on the total weight of the composition (C) and/or wherein the weight percent of pigment (P) is at most 20 wt. %, based on the total weight of composition (C).

* * * * *